United States Patent
Dickmann et al.

(10) Patent No.: US 10,972,845 B1
(45) Date of Patent: Apr. 6, 2021

(54) HEARING DEVICE AND SYSTEMS AND METHODS FOR COMMUNICATING WITH THE SAME

(71) Applicant: SONOVA AG, Staefa (CH)

(72) Inventors: Georg Dickmann, Ebmatingen (CH); Daniel Lucas-Hirtz, Rapperswil (CH)

(73) Assignee: Sonova AG, Staefa (CH)

(*) Notice: Subject to any disclaimer, the term of this patent is extended or adjusted under 35 U.S.C. 154(b) by 0 days.

(21) Appl. No.: 16/587,730

(22) Filed: Sep. 30, 2019

(51) Int. Cl.
*H04R 25/00* (2006.01)
*H04W 76/10* (2018.01)
*G06F 9/54* (2006.01)
*H04W 4/80* (2018.01)
*H04W 76/30* (2018.01)

(52) U.S. Cl.
CPC .......... *H04R 25/554* (2013.01); *G06F 9/542* (2013.01); *H04W 4/80* (2018.02); *H04W 76/10* (2018.02); *H04W 76/30* (2018.02)

(58) Field of Classification Search
CPC .. H04R 25/55; H04R 25/554; H04R 2225/55; H04M 1/6066
See application file for complete search history.

(56) References Cited

U.S. PATENT DOCUMENTS

| | | | |
|---|---|---|---|
| 6,006,115 A | 12/1999 | Wingate | |
| 7,174,026 B2* | 2/2007 | Niederdrank | H04R 25/43 381/312 |
| 7,376,393 B2* | 5/2008 | Ono | H04W 84/02 370/338 |
| 7,558,529 B2* | 7/2009 | Seshadri | H04M 1/6033 455/41.2 |
| 8,086,287 B2* | 12/2011 | Mooney | H04M 1/7253 455/575.2 |
| 9,716,969 B2 | 7/2017 | Song | |
| 9,763,276 B2 | 9/2017 | Seymour et al. | |
| 9,769,858 B2 | 9/2017 | Seymour et al. | |
| 9,826,320 B2* | 11/2017 | Gudiksen | H04R 25/554 |
| 9,949,044 B1* | 4/2018 | Choi | A61B 5/6815 |
| 10,141,974 B2* | 11/2018 | Waxman | H04B 1/713 |
| 10,149,073 B2* | 12/2018 | Polinske | H04R 25/554 |
| 10,554,587 B2* | 2/2020 | Treue | H04L 49/602 |
| 10,554,800 B2* | 2/2020 | Watson | H04W 76/36 |
| 2004/0063459 A1* | 4/2004 | Yamashita | H04H 20/88 455/556.1 |

(Continued)

*Primary Examiner* — Ryan Robinson
(74) *Attorney, Agent, or Firm* — ALG Intellectual Property, LLC

(57) ABSTRACT

An exemplary hearing device configured to assist a user in hearing comprises a memory storing instructions and a processor communicatively coupled to the memory. The processor may be configured to execute the instructions to receive, by way of a first wireless link established between the hearing device and a first external device using a first wireless communication protocol, audio content transmitted by the first external device, receive signaling data transmitted by a second external device and indicating that the second external device has additional audio content available to be transmitted to the hearing device, the signaling data transmitted to the hearing device using a second wireless communication protocol that is of a different type than the first wireless communication protocol, and perform, in response to receiving the signaling data, an action with respect to the additional audio content.

18 Claims, 10 Drawing Sheets

(56) References Cited

U.S. PATENT DOCUMENTS

| | | | |
|---|---|---|---|
| 2012/0244814 A1* | 9/2012 | Okayasu | H04M 1/6066 |
| | | | 455/41.3 |
| 2012/0321112 A1* | 12/2012 | Schubert | H04R 25/43 |
| | | | 381/312 |
| 2013/0260672 A1* | 10/2013 | Patil | H04M 1/7253 |
| | | | 455/7 |
| 2014/0064528 A1* | 3/2014 | Flood | H04R 25/558 |
| | | | 381/315 |
| 2016/0227470 A1* | 8/2016 | Liu | H04W 48/10 |
| 2017/0006415 A1 | 1/2017 | Song | |
| 2018/0124527 A1* | 5/2018 | El-Hoiydi | H04L 63/0428 |
| 2019/0104423 A1* | 4/2019 | Hariharan | H04W 24/02 |
| 2019/0215597 A1* | 7/2019 | Ha | H04W 4/80 |
| 2020/0100089 A1* | 3/2020 | Ferrari | H04W 4/80 |
| 2020/0252731 A1* | 8/2020 | Davis | H04R 25/43 |

* cited by examiner

HEARING DEVICE AND SYSTEMS AND METHODS FOR COMMUNICATING WITH THE SAME

BACKGROUND INFORMATION

Hearing devices (e.g., hearing aids) are used to improve the hearing capability and/or communication capability of users. Such hearing devices are configured to process a received input sound signal (e.g., ambient sound) and then provide the processed input sound signal to the user (e.g., by way of a receiver placed in the user's ear canal or at any other suitable location).

Wireless communication technology provides such hearing devices with the capability of wirelessly connecting to external devices for programming, controlling, and/or streaming audio content to the hearing devices. For example, a Bluetooth Classic protocol may be used to establish a Bluetooth classic wireless link between a hearing device and tablet computer. Through the Bluetooth Classic wireless link, the tablet computer may stream audio content to the hearing device, which then passes the audio content on to the user (e.g., by way of the receiver). However, hearing devices are limited in the number of wireless links that may be concurrently maintained at a given time using a particular communication protocol. For example, a hearing device may be only be capable of connecting with one external device at a time by way of a Bluetooth classic wireless link. As such, in the example described above, while the hearing device is communicatively coupled to the tablet computer by way of a Bluetooth Classic wireless link, another external device may not be able to connect to or communicate with the hearing device, which may result in the user missing potentially important notifications from the other external device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
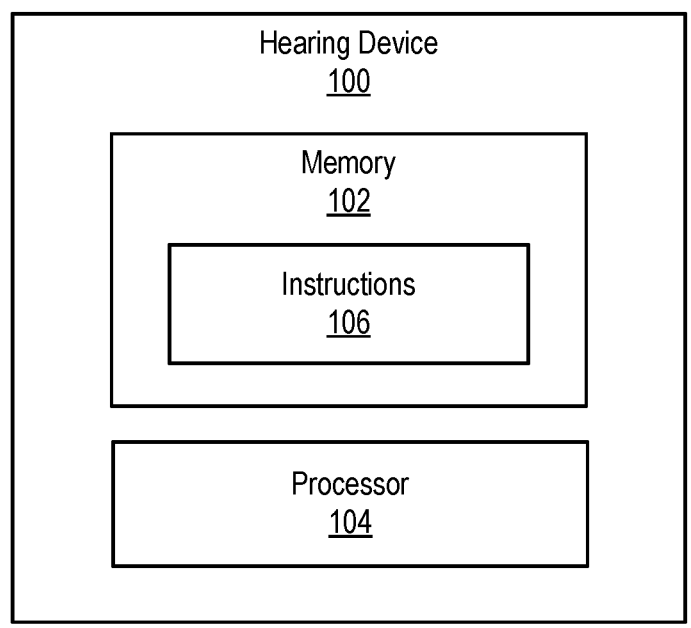
FIG. 1 illustrates an exemplary hearing device according to principles described herein.

A hearing device and systems and methods for communicating with the same are described herein. As will be described in more detail below, an exemplary hearing device that is configured to assist a user in hearing may include a memory storing instructions and a processor communicatively coupled to the memory. The processor may be configured to execute the instructions to receive, by way of a first wireless link established between the hearing device and a first external device using a first wireless communication protocol, audio content transmitted by the first external device, receive signaling data transmitted by a second external device and indicating that the second external device has additional audio content available to be transmitted to the hearing device, the signaling data transmitted to the hearing device using a second wireless communication protocol that is of a different type than the first wireless communication protocol, and perform, in response to receiving the signaling data, an action with respect to the additional audio content.

To illustrate an example, a hearing device (e.g., a hearing aid) of a user may be communicatively coupled to a first external device (e.g., a smart television) by way of a first wireless link established using a first wireless communication protocol (e.g., a Bluetooth Classic ("BTC") protocol). While the hearing device is communicatively coupled to the first external device by way of the first wireless link, a second external device (e.g., a smartphone associated with the user) may have additional audio content (e.g., an incoming phone call from another external device) available for the user. However, because the first external device is already communicatively coupled to the hearing device by way of the first wireless link, the second external device may not be able to communicate with or connect to the hearing device using the first wireless communication protocol. Accordingly, the second external device may utilize a second wireless communication protocol (e.g., a Bluetooth Low Energy ("BLE") protocol) that is of a different type than the first wireless communication protocol to communicate with the hearing device and transmit signaling data to the hearing device. In response to receiving the signaling data, the hearing device may take any suitable action with respect to the additional audio content. For example, the hearing device may provide the user with an acoustical notification (e.g., through a receiver in the user's ear canal or positioned at any other suitable location) indicating that the additional audio content is available. The user may then either accept receipt of the additional audio content (e.g., by answering the incoming call) or may decline receipt of the additional audio content (e.g., by ignoring the incoming call).

By utilizing a wireless communication protocol such as a BLE protocol to communicate with a hearing device, it is possible to facilitate other external devices communicating with the hearing device even while the hearing device is already wirelessly linked to an external device by way of, for example, a BTC wireless link established using a BTC protocol. In so doing, notifications from the other external devices that may have otherwise been missed may be provided to the user of the hearing device. In addition, by using a wireless communication protocol such as a BLE protocol to communicate with a hearing device, it may be possible to reduce power consumption of hearing devices and/or external devices such as those described herein. Other benefits of the hearing devices and systems described herein will be made apparent herein.

As used herein, a "hearing device" may be implemented by any device configured to provide or enhance hearing to a user. For example, a hearing device may be implemented by a hearing aid configured to amplify audio content to a user, a sound processor included in a cochlear implant system configured to apply electrical stimulation representative of audio content to a user, a sound processor included in a stimulation system configured to apply electrical and acoustic stimulation to a user, or any other suitable hearing prosthesis or combination of hearing prostheses. In some examples, a hearing device may be implemented by a behind-the-ear ("BTE") hearing device configured to be worn behind an ear and/or at least partially within an ear canal of a user.

FIG. 1 illustrates an exemplary hearing device 100. As shown, hearing device 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and processor 104 may be distributed between multiple devices (e.g., multiple hearing devices in a binaural hearing system) and/or multiple locations as may serve a particular implementation.

Memory 102 may maintain (e.g., store) executable data used by processor 104 to perform any of the operations associated with hearing device 100 described herein. For example, memory 102 may store instructions 106 that may be executed by processor 104 to perform any of the operations associated with hearing device 100 described herein. Instructions 106 may be implemented by any suitable application, software, code, and/or other executable data instance.

Memory 102 may also maintain any data received, generated, managed, used, and/or transmitted by processor 104. For example, memory 102 may maintain any data suitable to facilitate wireless communications (e.g., short range wireless communications) between hearing device 100 and one or more external devices and/or provide notifications, such as those described herein, to the user. Memory 102 may maintain additional or alternative data in other implementations.

Processor 104 is configured to perform any suitable processing operation that may be associated with hearing device 100. For example, when hearing device 100 corresponds to a hearing aid device, such processing operations may include monitoring ambient sound and/or representing sound to a user via an in-ear receiver. In examples where hearing device 100 is included as part of a cochlear implant system, such processing operations may include directing a cochlear implant to generate and apply electrical stimulation representative of one or more audio signals (e.g., one or more audio signals detected by a microphone, input by way of an auxiliary audio input port, etc.) to one or more stimulation sites associated with an auditory pathway (e.g., the auditory nerve) of a user.

Processor 104 may be further configured to perform (e.g., execute instructions 106 stored in memory 102 to perform) various processing operations associated with facilitating hearing device 100 communicating with and/or connecting to an external device (e.g., a smartphone, a smart television, etc.). For example, processor 104 may receive, by way of a first wireless link established between a hearing device (e.g., hearing device 100) and a first external device using a first wireless communication protocol, audio content transmitted by the first external device, receive signaling data transmitted by a second external device and indicating that the second external device has additional audio content available to be transmitted to the hearing device, the signaling data transmitted to the hearing device using a second wireless communication protocol that is of a different type than the first wireless communication protocol, and perform, in response to receiving the signaling data, an action with respect to the additional audio content. These and other operations that may be performed by processor 104 are described herein.

Hearing device 100 may include any suitable communication interface configured to facilitate hearing device 100 communicating with one or more external devices. As used herein, an "external device" refers to any external system or device that may be configured to communicate with hearing device 100. Exemplary external devices may include, but are not limited to, smartphones, tablet computers, laptop computers, home automation systems, smart televisions, internet of things ("IoT") devices, etc.

Figure 2:
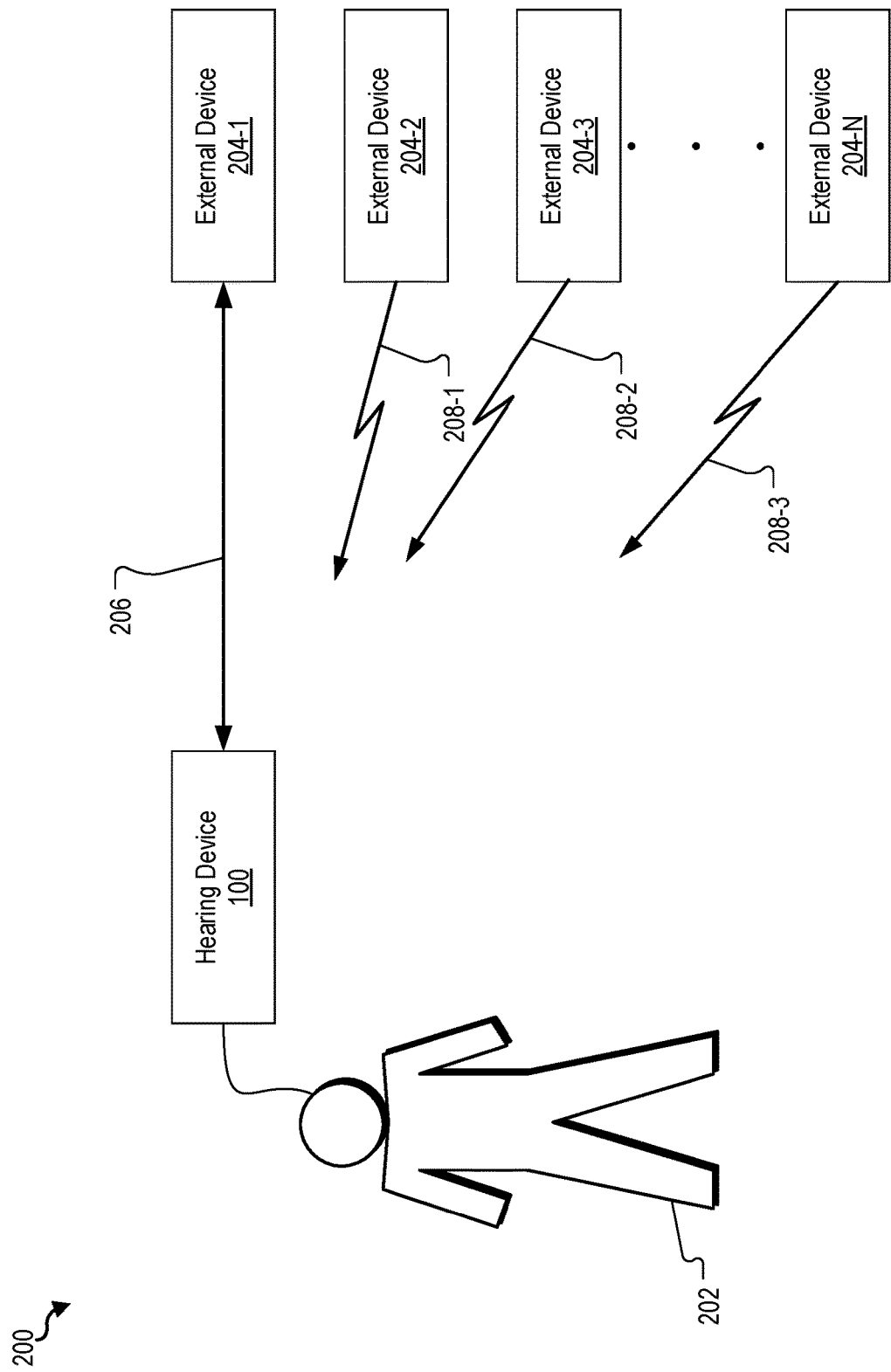
FIG. 2 illustrates an exemplary diagram showing potential communications between a hearing device and a plurality of external devices according to principles described herein.

FIG. 2 shows an exemplary configuration 200 in which hearing device 100 may be implemented. As shown in FIG. 2, hearing device 100 is associated with a user 202 and is configured to be selectively in communication with one or more of a plurality of external devices 204 (e.g., external devices 204-1 through 204-N). In the example shown in FIG. 2, hearing device 100 is communicatively coupled to external device 204-1 by way of a wireless link 206 that is established using a first wireless communication protocol. Wireless link 206 may be established using any suitable wireless communication protocol that is configured to wirelessly provide (e.g., stream) audio content to hearing device 100. For example, in certain implementations wireless link 206 may be a BTC link established using a BTC protocol. While external device 204-1 is communicatively connected to hearing device 100 by way of wireless link 206, external device 204-1 may provide audio content to hearing device 100 in any suitable manner using any suitable audio streaming protocol. For example, such audio content may be streamed to hearing device 100 using an Advanced Audio Distribution Profile ("A2DP"), which defines how multimedia audio may be streamed from one device to another over a BTC wireless link.

In certain examples, hearing device 100 may be configured to connect to a limited number of external devices 204 at a time by way of a wireless link established using the first wireless communication protocol. For example, hearing device 100 may be configured to maintain only one BTC link at a time, only two BTC links at a time, only three BTC links at a time, etc. However, regardless of how many wireless links hearing device 100 is configured to concurrently maintain using the first wireless communication protocol, hearing device 100 cannot connect to additional external devices using the first wireless communication protocol if all of the available wireless links are being used. As such, in certain examples, hearing device 100 may be incapable of connecting to more than one external device at a time by way of a wireless link established using the first wireless communication protocol.

In the exemplary configuration 200 shown in FIG. 2, hearing device 100 is already connected to external device 204-1 by way of wireless link 206 established using the first wireless communication protocol. As such, hearing device 100 may be incapable of concurrently connecting to, for example, external device 204-2 or external device 204-3 by way of an additional wireless link 206 established using the first wireless communication protocol. In such instances, external devices 204-2, 204-3, etc. may be configured to send signaling data 208 (e.g., signaling data 208-1 through 208-3) using a second wireless communication protocol that is of a different type than the first wireless communication protocol.

The second wireless communication protocol may include any suitable wireless communication protocol that is of a different type than the first wireless communication protocol but that is configured to communicate with hearing device 100 while hearing device 100 receives audio content by way of the first wireless communication protocol. For example, the second wireless communication protocol may correspond to a BLE protocol, which may be used to transmit relatively small amounts of data over short distances (e.g., 2-5 meters) with relatively low energy consumption as compared to the BTC protocol.

In certain examples, the second wireless communication protocol may be incapable of being used to transmit audio content (e.g., because of bandwidth and/or protocol limitations). Alternatively, the second wireless communication protocol may be capable of being used to transmit audio content but may not be able to transmit audio content to hearing device 100 while hearing device 100 receives audio content by way of the first wireless communication protocol.

When the second wireless communication protocol corresponds to a BLE protocol, external devices 204 may be configured to operate in either a broadcast topology or a connection topology to transmit signaling data 208. With the broadcast topology, signaling data 208 may be broadcast from external devices 204 using the BLE protocol. In examples where a broadcast topology is used, hearing device 100 may be considered as an observer device and, for example, external device 204-2 may be considered as a broadcaster device. On the other hand, with the connection topology, signaling data 206 may transmitted between hearing device 100 and external devices 204 using an established BLE link. In such examples, hearing device 100 may be considered as a peripheral (slave) device and external devices 204 may be considered as central (master) devices.

Although only one hearing device 100 is shown in FIG. 2, it is understood that hearing device 100 may be included in a system that includes more than one hearing device configured to provide or enhance hearing to a user. For example, hearing device 100 may be included in a binaural hearing system that includes two hearing devices, one for each ear. In such examples, hearing device 100 may be provided behind, for example, the left ear of the user and an additional hearing device may be provided behind the right ear of the user. When hearing device 100 is included as part of a binaural hearing system, hearing device 100 may be communicatively connected to external device 204-1 by way of wireless link 206 and the additional hearing device may act as a slave device to hearing device 100. Hearing device 100 may communicate with the additional hearing device by way of a binaural communication link that interconnects hearing device 100 with the additional hearing device. Such a binaural communication link may include any suitable wireless or wired communication link as may serve a particular implementation. Hearing device 100 may send audio content transmitted to hearing device 100 from external device 204-1 by way of wireless link 206 to the additional hearing device by way of the binaural communication link.

Figure 3:
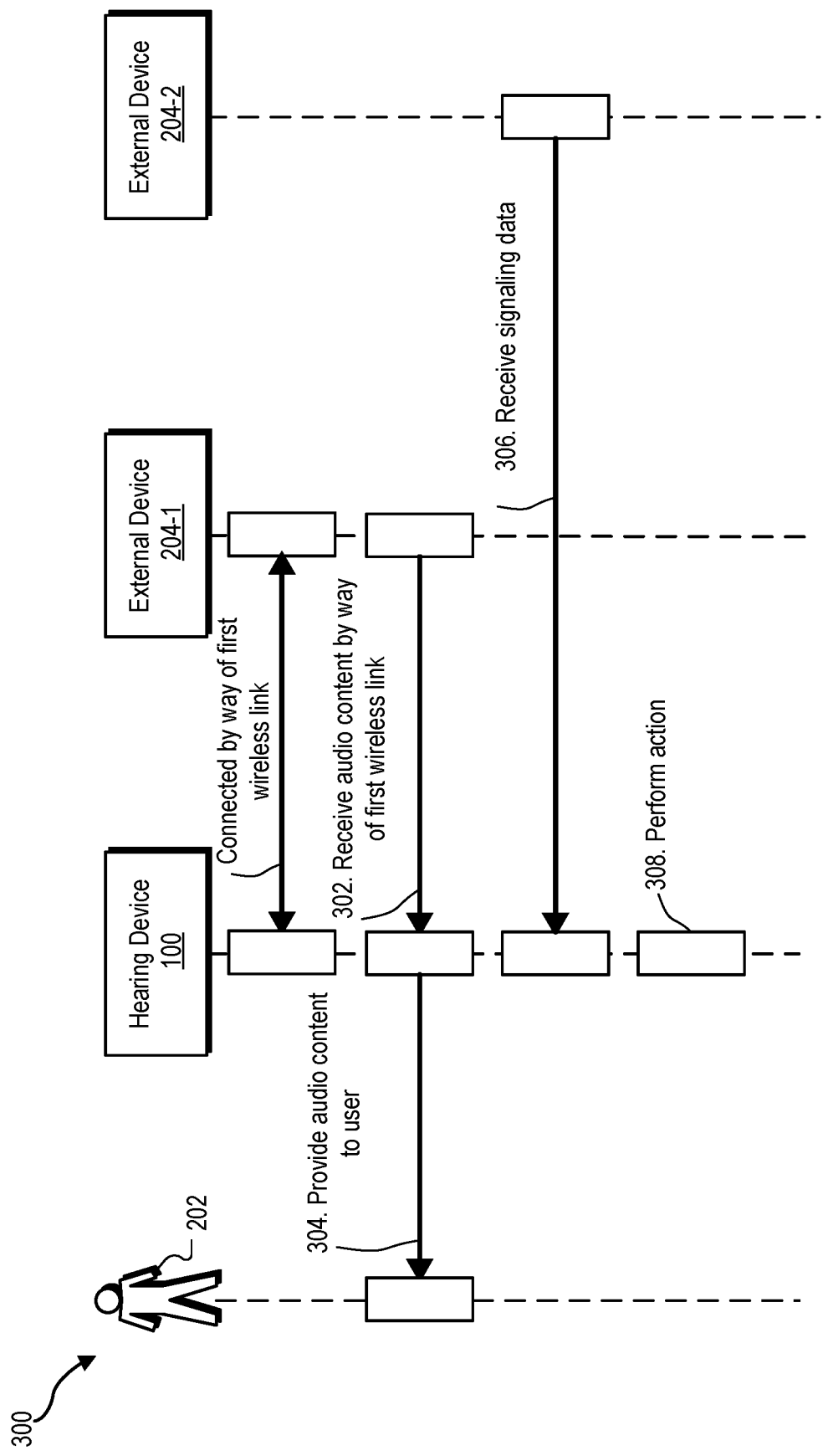
FIGS. 3 and 4 illustrate exemplary sequence diagrams depicting communications and/or operations that may be performed between hearing devices, external devices, and/or exemplary systems such as those described herein according to principles described herein.
Figure 4:
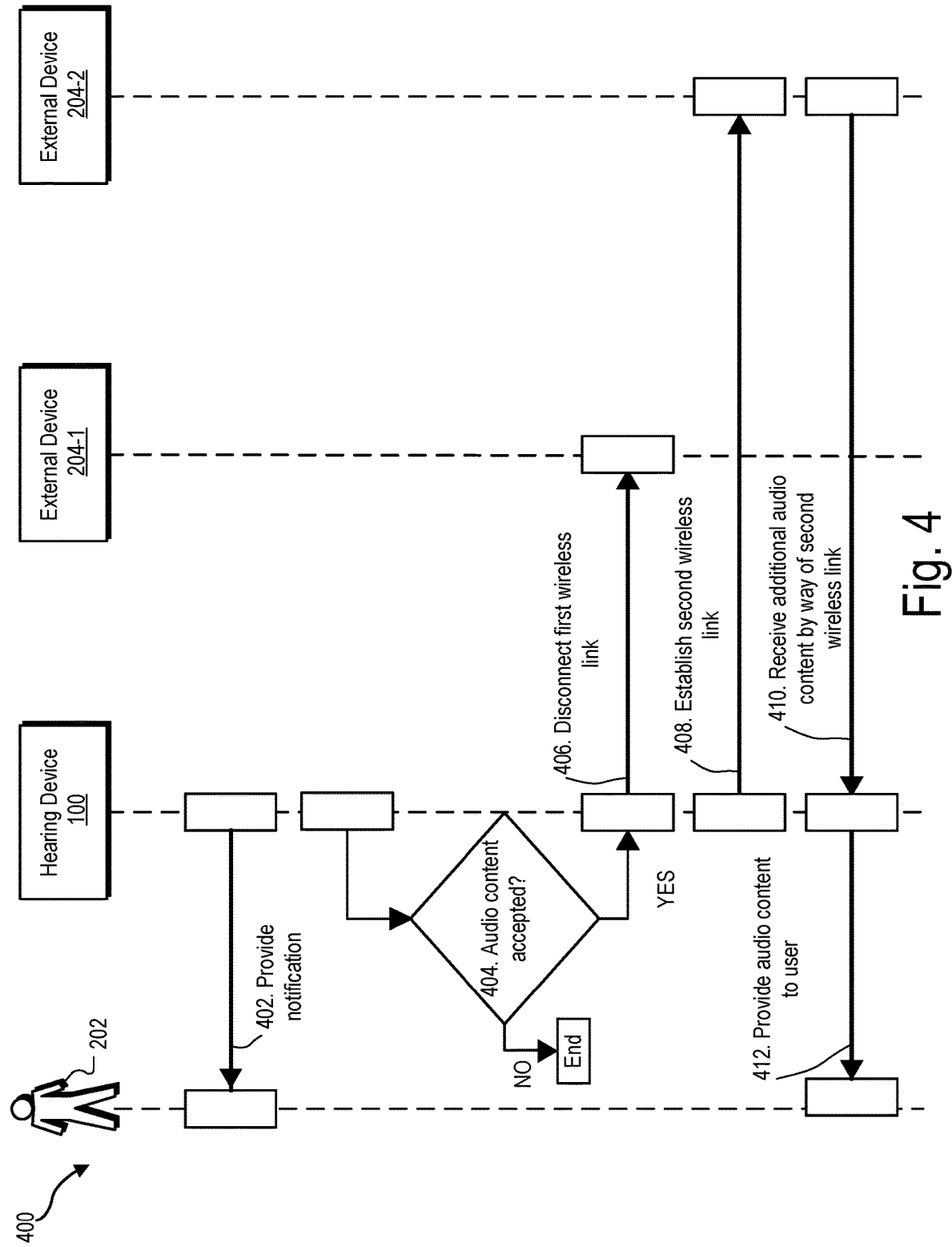

FIGS. 3 and 4 illustrate exemplary sequence diagrams 300 and 400 depicting communications between and/or operations that may be performed by hearing device 100 and external devices 204.

In the exemplary sequence diagram 300 shown in FIG. 3, hearing device 100 is communicatively connected to external device 204-1 by way of a first wireless link (e.g., a BTC link). As described herein, the first wireless link may be established using a first wireless communication protocol (e.g., a BTC protocol) that is configured to transmit audio content. While hearing device 100 is communicatively connected to external device 204-1 in such a manner, hearing device 100 (e.g., processor 104) may receive the audio content from external device 204-1 by way of the first wireless link in operation 302. Hearing device 100 may then represent the audio content to user 202 in any suitable manner to in operation 304. For example, hearing device 100 may cause the audio content to be represented to user 202 by way of a receiver.

While hearing device 100 is communicatively connected to external device 204-1 by way of the first wireless link, external device 204-2 may have additional audio content available to be transmitted to hearing device 100. Such additional audio content may include any suitable audio content that may be transmitted to hearing device 100. For example, the additional audio content may be associated with an incoming call (e.g., a voice call, a video call, etc.), a notification, an alert, an alarm, etc.

As mentioned, hearing device 100 may only be configured to maintain one wireless link at a time using the first wireless communication protocol. As such, because hearing device 100 is already communicatively connected to external device 204-1 by way of the wireless link, hearing device 100 may not be capable of establishing an additional wireless link using the first wireless communication protocol. Accordingly, hearing device 100 is configured to receive signaling data (e.g., signaling data 208) transmitted from external device 202-2 in operation 306. The signaling data indicates that the additional audio content is available to be transmitted from external device 202-2 to hearing device 100. As described herein, the signaling data received by hearing device 100 is received using a second wireless communication protocol (e.g., a BLE protocol) that is of a different type than the first wireless communication protocol.

The signaling data may be received by hearing device 100 in operation 306 in any suitable manner. For example, hearing device 100 may receive the signaling data in a packet broadcast by external device 204-2 when external device 204-2 is configured to operate according to a broadcast topology using the second wireless communication protocol. Alternatively, if external device 204-2 is configured to operate according to a connection topology using the second wireless communication protocol, hearing device 100 may receive the signaling data by way of a wireless link established between hearing device 100 and external device 204-2 using the second wireless communication protocol.

In response to the signaling data, hearing device 100 may perform any suitable action with respect to the additional audio content in operation 308. In certain examples, hearing device 100 may, based on the signaling data received from external device 204-2, provide a notification to user 202. Hearing device 100 may provide such a notification in any suitable manner to user 202. In certain examples, the notification may include an acoustic notification generated by hearing device 100 and provided to user 202. For example, in certain implementations, hearing device 100 may direct a receiver to play a predefined audio tone stored in memory 102 in response to the signaling data transmitted from external device 204-2.

In certain examples, hearing device 100 may transmit a notification to an additional hearing device communicatively coupled to hearing device 100. For example, hearing device 100 may be included in a binaural hearing system in which hearing device 100 is configured to assist user 202 in hearing in one ear of user 202 and an additional hearing device is configured to assist user 202 in hearing in the other ear. In such examples, hearing device 100 may transmit the notification to the additional hearing device by way of a binaural communication link communicatively connecting the hearing devices.

Additionally or alternatively, hearing device 100 may instruct an additional external device to provide any suitable notification to user 202 regarding the additional audio content. For example, external device 204-1 may correspond to a tablet computer. Based on the signaling data, hearing device 100 may instruct external device 204-1 in any suitable manner to display a notification on a display screen of external device 204-1 that informs user 202 of the availability of the additional audio content.

In certain alternative examples, hearing device 100 may take no action with respect to the signaling data. For example, based on an instruction from user 202, hearing device 100 may be in a "do not disturb mode" while connected to external device 204-1 by way of a wireless link established using the first wireless communication protocol. In such an example, hearing device 100 may not provide a notification to user 202 that the additional audio content is available.

FIG. 4 shows various exemplary actions/operations that may be performed by hearing device 100 in response to the signaling data. In the exemplary sequence diagram 400 shown in FIG. 4, hearing device 100 may provide a notification to user 202 in operation 402 in any suitable manner, such as described herein.

In operation 404, hearing device 100 may determine whether user 202 has accepted receipt of the additional audio content. This may be accomplished in any suitable manner. For example, hearing device 100 may determine that user 202 accepted receipt of the additional audio content based on a touch input provided through hearing device 100 (e.g., through a button or touch interface provided on a BTE module of hearing device 100). Alternatively, hearing device 100 may determine that user 202 accepted receipt of the additional audio content based on a verbal command provided by user 202. For example, user 202 may say "accept call" in response to the notification. Hearing device 100 may then use any suitable speech recognition technology to determine that user 202 has accepted receipt of the additional audio content. In certain alternative implementations, hearing device 100 may determine that user 202 has accepted receipt of the additional audio content based on an input provided by user 202 through a user interface of external device 204-2. For example, if the additional audio content is associated with an incoming call to external device 204-2, user 202 may execute an accept call input through, for example, a touch interface of external device 204-2. External device 204-2 may then inform hearing device 100 through additional signaling data transmitted by way of the second wireless communication protocol that the incoming call has been accepted.

If hearing device 100 determines that user 202 did not accept receipt of the additional audio content in operation 404, hearing device 100 may end the process and take no further action with respect to the signaling data. For example, hearing device 100 may abstain from disconnecting the first wireless link between hearing device 100 and external device 204-1. As such, user 202 may continue to consume audio content transmitted from external device 204-1 by way of the first wireless link without interruption.

On the other hand, if hearing device 100 determines that user 202 accepted receipt of the additional audio content, hearing device 100 may be configured to disconnect the first wireless link in operation 406 such that external device 204-1 is no longer connected to hearing device 100 using the first wireless communication protocol. In operation 408, hearing device 100 may establish a second wireless link with hearing device 204-2 using the first wireless communication protocol. Hearing device 100 may receive the additional audio content by way of the second wireless link in operation 410. Hearing device may then provide the additional audio content in any suitable manner to user 202 in operation 412.

In the exemplary sequence diagram 400 shown in FIG. 4, hearing device 100 may disconnect the first wireless link in response to user 202 accepting to receive the additional audio content from external device 204-2. However, in certain alternative implementations, hearing device 100 may automatically (e.g., without requiring additional input from user 202) disconnect the first wireless link and establish the second wireless link in response to receipt of the signaling data.

In certain examples, the additional audio content may be associated with an incoming call to external device 204-2 that is intended for user 202. In such example, the disconnecting of the first wireless link may be performed after external device 204-2 establishes the incoming call.

In certain examples, prior to disconnecting the first wireless link, hearing device may perform any suitable action to improve a user experience associated with receiving audio content by way of hearing device 100. For example, hearing device 100 may be configured to pause the audio content transmitted from external device 202-1 based on the signaling data transmitted from external device 204-2. To illustrate, external device 204-1 may be streaming music to hearing device 100 by way of the first wireless link. In response to user 202 accepting receipt of the additional audio content and prior to disconnecting the first wireless link, hearing device 100 may automatically instruct external device 204-1 to pause playback of the music until such a time that hearing device 100 is reconnected to external device 204-1 using the first wireless communication protocol.

In certain examples, hearing device 100 may be further configured to determine that external device 204-2 has stopped transmitting the additional audio content to hearing device 100 by way of the second wireless link. Hearing device 100 may make such a determination in any suitable manner. For example, hearing device 100 may determine, in any suitable manner, that no data is being transmitted from external device 204-2 to hearing device 100 by way of the second wireless link. Based on such a determination, hearing device 100 may disconnect the second wireless link between hearing device 100 and external device 204-2. Hearing device 100 may then establish a third wireless link between hearing device 100 and external device 204-1 using the first wireless communication protocol. Afterwards, hearing device 100 may receive the audio content again from external device 204-1 by way of the third wireless link. In the example described above where external device streams music to hearing device 100, hearing device 100 may direct external device 204-1 to automatically resume the playback of the music once the third wireless link is established.

In certain examples, hearing device 100 may not disconnect the first wireless link with external device 204-1 prior to receiving the additional audio content from external device 204-2 by way of the second wireless link. For example, hearing device 100 may tear down the audio content carried by way of the first wireless link but may still maintain a connection to external device 204-1 by way of the first wireless link. In such examples, hearing device 100 may be free to receive the additional audio content from external device 204-2 by way of the second wireless link even while still being connected to external device 204-1 by way of the first wireless link.

Figure 5:
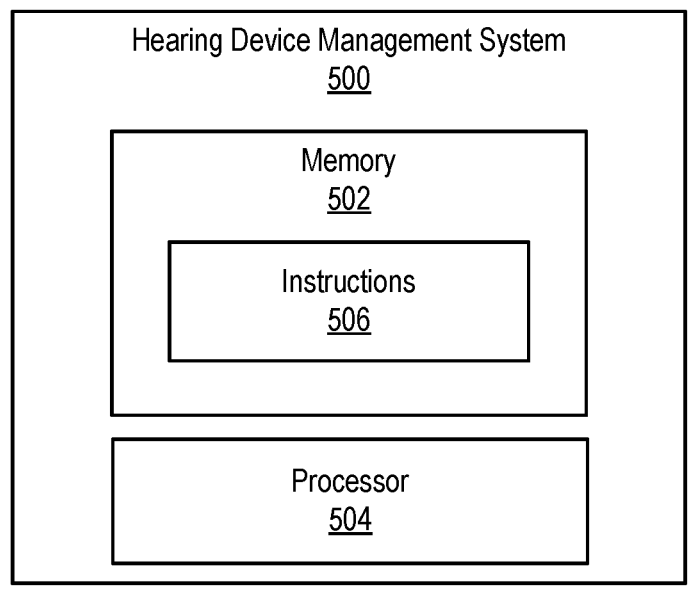
FIG. 5 illustrates an exemplary hearing device management system that may be implemented according to principles described herein.

In certain examples, communications between hearing device 100 and one or more external devices may be controlled and/or facilitated by a hearing device management system. FIG. 5 illustrates an exemplary hearing device management system 500 ("system 500") that may be implemented according to principles described herein. As shown in FIG. 5, system 500 may include, without limitation, a memory 502 and a processor 504 selectively and communicatively coupled to one another. Memory 502 and processor 504 may each include or be implemented by hardware and/or software components (e.g., processors, memories, communication interfaces, instructions stored in memory for execution by the processors, etc.). In some examples, memory 502 and processor 504 may be distributed between multiple devices and/or multiple locations as may serve a particular implementation.

Memory 502 may maintain (e.g., store) executable data used by processor 504 to perform any of the operations described herein. For example, memory 502 may store instructions 506 that may be executed by processor 504 to perform any of the operations described herein. Instructions 506 may be implemented by any suitable application, software, code, and/or other executable data instance.

Memory 502 may also maintain any data received, generated, managed, used, and/or transmitted by processor 504. Memory 502 may store any other suitable data as may serve a particular implementation. For example, memory 502 may store any suitable data associated with establishing and/or maintaining communications with a hearing device (e.g., hearing device 100).

Processor 504 may be configured to perform (e.g., execute instructions 506 stored in memory 502 to perform) various processing operations associated with facilitating communications with a hearing device. For example, processor 504 may instruct an external device to transmit signaling data to a hearing device indicating that the second external device has additional audio content available to be transmitted to the hearing device. This and other operations that may be performed by processor 504 are described herein.

System 500 may be implemented in any suitable manner as may serve a particular implementation. For example, system 500 may be implemented as an application that is stored in a memory of an external device, such as a smartphone, and executed by a processor of the external device. Alternatively, system 500 may be implemented as a cloud-based application that is stored on a remote server and is accessed by an external device, such as a smartphone, to facilitate communications between a hearing device and one or more external devices.

Figure 6:
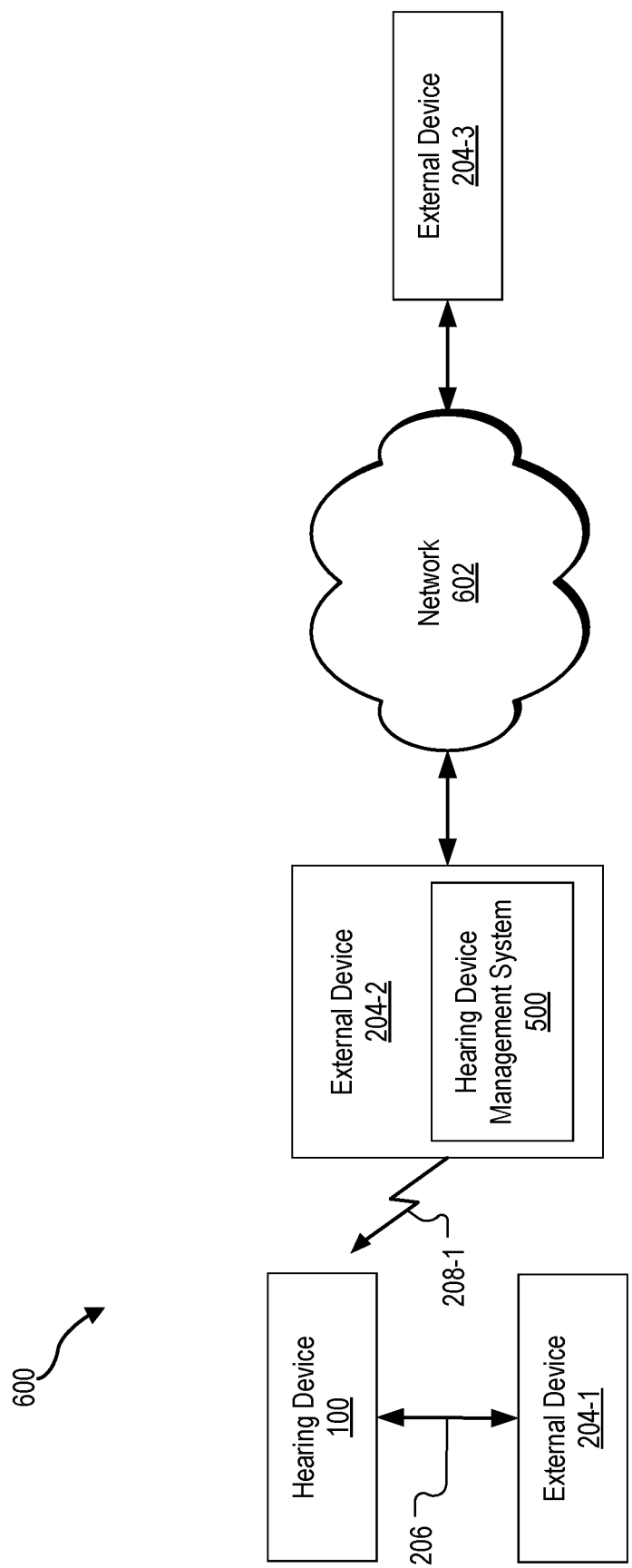
FIG. 6 illustrates an exemplary network configuration in which the hearing device management system shown in FIG. 5 may be implemented according to principles described herein.

FIG. 6 shows an exemplary configuration 600 in which system 500 may be implemented. As shown in FIG. 6, configuration 600 includes hearing device 100, external device 204-1, and external device 204-2, which may be in communication with one another in a manner similar to that described with reference to FIG. 2. External device 204-2 includes system 500 (e.g., as an application stored in a memory of external device 204-2) and is communicatively connected to external device 204-3 by way of a network 602.

Network 602 may include any provider-specific wired or wireless network (e.g., a cable or satellite carrier network or a mobile telephone network), the Internet, a wide area network, or any other suitable network. Data may flow between external device 204-2 and external device 204-3 using any communication technologies, devices, media, and protocols as may serve a particular implementation. For example, external device 204-2 and external device 204-3 may communicate using any suitable communication technologies, devices, media, and/or protocols supportive of data communications, including, but not limited to, socket connections, Ethernet, data bus technologies, data transmission media, communication devices, media streaming technologies (e.g., video streaming technologies), Moving Picture Experts Group ("MPEG") protocols, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Markup Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), WiMax, Time Division Multiple Access ("TDMA") technologies, radio frequency ("RF") signaling technologies, wireless communication technologies (e.g., Bluetooth, Wi-Fi, etc.), in-band and out-of-band signaling technologies, and other suitable communications technologies. While only one network 602 is shown to external devices 204-2 and 204-3 in FIG. 6, it will be recognized that these devices and systems may intercommunicate by way of multiple and/or different interconnected networks as may serve a particular implementation.

System 500 (e.g., processor 504) may perform various operations associated with facilitating communications with hearing device 100. In certain examples, system 500 may determine that first wireless 206 link is established between external device 204-1 and hearing device 100. As described herein, first wireless link 206 is capable of carrying audio content transmitted from external device 204-1 to hearing device 100 and is established using a first wireless communication protocol (e.g., a BTC protocol).

System 500 may determine whether external device 204-2 has additional audio content available to be transmitted to hearing device 100. This may be accomplished in any suitable manner. For example, external device 204-2 may be configured to notify system 500 whenever there is an incoming call to external device 204-2. Based on the availability of the additional audio content, system 500 may instruct external device 204-2 to transmit signaling data 208-1 to hearing device 100 using a second wireless communication protocol (e.g., a BLE protocol) that is of a different type than the first wireless communication protocol. As described herein, the signaling data indicates that external device 204-2 has additional audio content available to be transmitted to hearing device 100.

In certain alternative examples, system 500 may not determine whether first wireless link 206 is established between the external device 204-1 and hearing device 100.

Rather, system 500 may instruct the external device 204-2 to transmit signaling data 208-1 to hearing device 100 regardless of whether first wireless link 206 is established between external device 204-1 and hearing device 100.

System 500 may further determine in any suitable manner, such as described herein, that the user of hearing device 100 instructs hearing device 100 to receive the additional audio content. Based on the determination that the user of hearing device 100 instructs hearing device 100 to receive the additional audio content, system 500 may instruct external device 204-2 to establish a wireless link between external device 204-2 and hearing device 100 using the first wireless communication protocol. System 500 may then instruct external device 204-2 to transmit the additional audio content to hearing device 100 by way of the second wireless link between external device 204-2 and hearing device 100.

In certain examples, system 500 may determine, prior to instructing external device 204-2 to establish the second wireless link, that first wireless link 206 between external device 204-1 and hearing device 100 has been disconnected. This may be accomplished in any suitable manner. For example, system 500 may instruct external device 204-2 to communicate with hearing device 100 by way of the second wireless communication protocol to determine whether first wireless link 206 between external device 204-1 and hearing device 100 has been disconnected.

Figure 7:
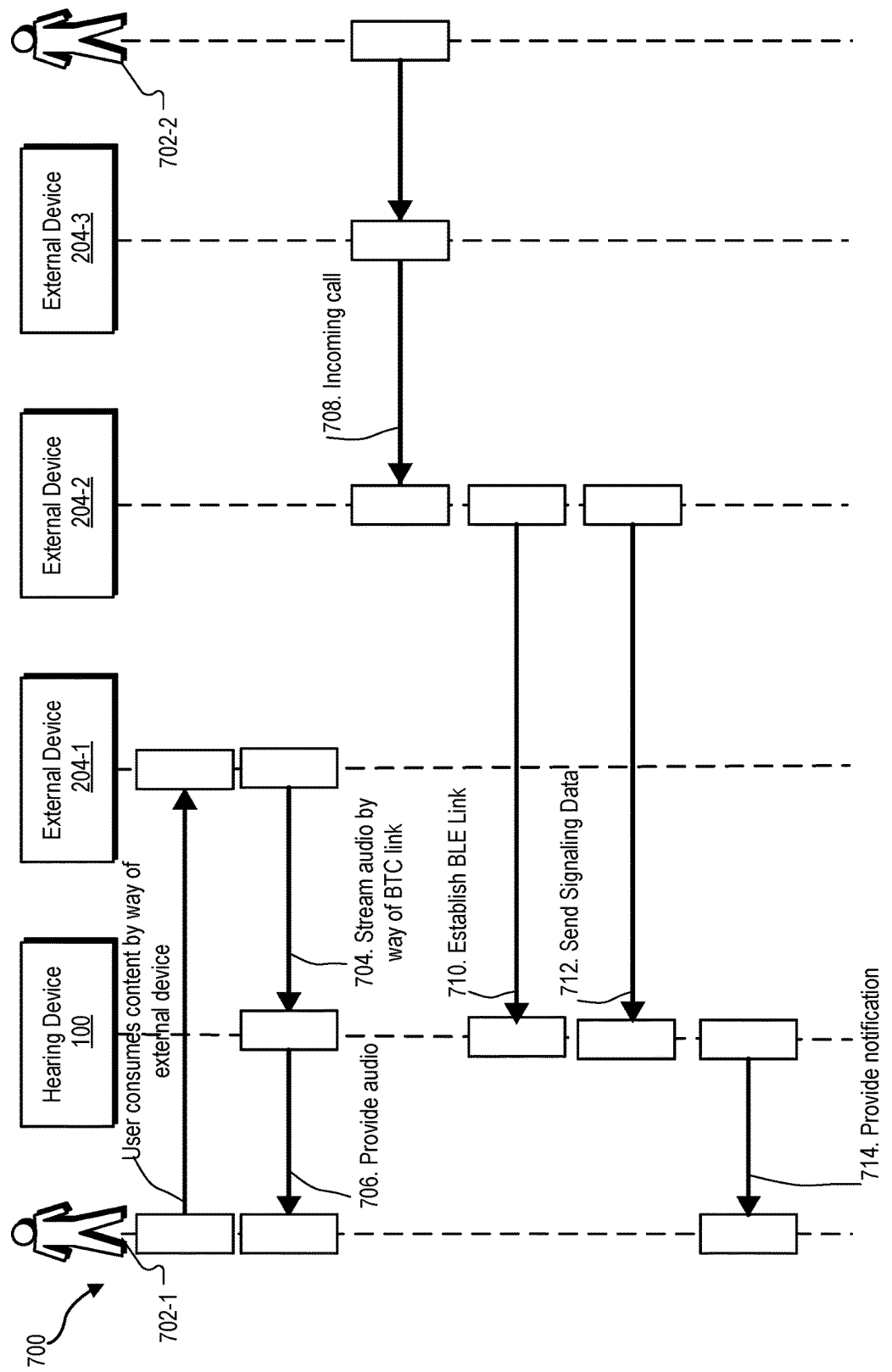
FIGS. 7 and 8 illustrate additional exemplary sequence diagrams depicting communications and/or operations that may be performed between hearing devices, external devices, and/or exemplary systems such as those described herein according to principles described herein.
Figure 8:
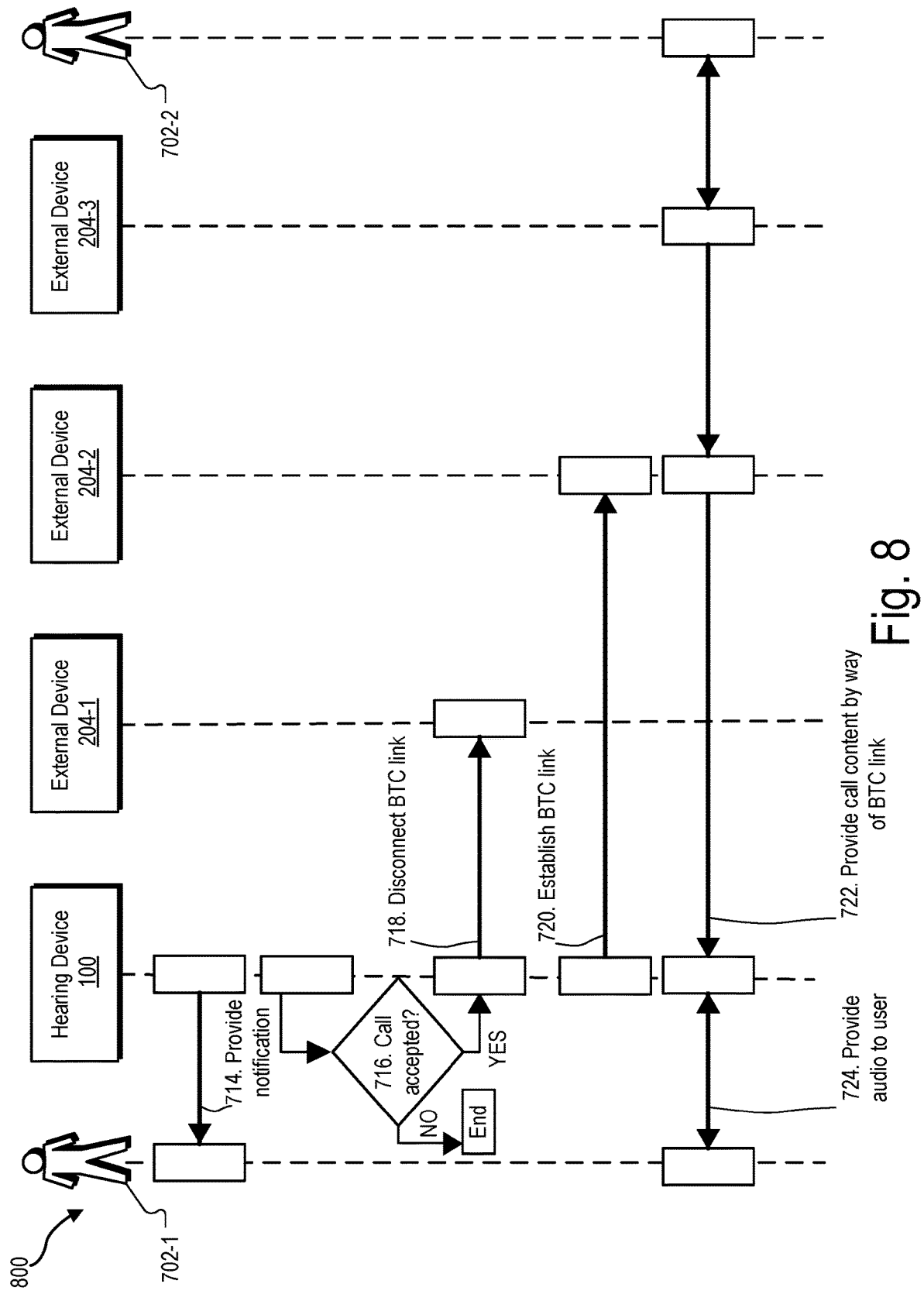

FIGS. 7 and 8 illustrate exemplary sequence diagrams 700 and 800 depicting communications between and/or operations that may be performed by hearing device 100 and external devices 204 according to a particular exemplary implementation. Sequence diagram 800 is a continuation of the communications and/or operations depicted in sequence diagram 700. In the exemplary sequence diagram 700 shown in FIG. 7, a BTC link is established between hearing device 100 and external device 204-1. While hearing device 100 is connected with external device 204-1 by way of the BTC link, a user 702-1 may consume content by way of external device 204-1. For example, external device 204-1 may be a tablet computer through which user 202 is watching a video. External device 204-1 may stream audio content associated with the video by way of the BTC link to hearing device 100 in operation 704. In operation 706, hearing device 100 may provide audio associated with the video to user 702-1 in any suitable manner, such as described herein.

While hearing device 100 is communicatively connected to external device 204-1 by way of the BTC link, an additional user 702-2 may use external device 204-3 to initiate a call (e.g., a voice call, a video call, etc.) with external device 204-2. External device 204-2 may receive the incoming call in operation 708. The incoming call from external device 204-3 to external device 204-2 may be facilitated through any suitable network technology or combination of network technologies, such as those described herein. External device 204-2 may ring or provide some other alert associated with the incoming call. However, user 702-1 may not hear the ring or other alert because user 702-1 is currently listening to audio associated with the video displayed by external device 204-1. Accordingly, to facilitate user 702-1 being aware of the incoming call, external device 204-2 may establish a BLE link between external device 204-2 and hearing device 100 in operation 710. External device 204-2 may transmit signaling data to hearing device 100 by way of the BLE link in operation 712. The signaling data indicates to hearing device 100 that external device 204-2 has an incoming call intended for user 702-1. Based on the signaling data, hearing device 100 may provide a notification to user 702-1 in operation 714 in any suitable manner, such as described herein.

In sequence diagram 800 shown in FIG. 8, operation 714 is shown again to emphasize that sequence diagram 800 is a continuation of sequence diagram 700. In operation 716, hearing device 100 may determine whether the incoming call has been accepted by user 702-1. If hearing device 100 determines that the incoming call was not accepted by user 702-1, hearing device 100 may end the process and take no further action with respect to the signaling data. On the other hand, if hearing device 100 determines that user 702-1 accepted the incoming call, hearing device 100 may disconnect the BTC link between external device 204-1 and hearing device 100. Once the BTC link is disconnected between external device 204-1 and hearing device 100, hearing device 100 is free to connect with external device 204-2 by way of another BTC link. Accordingly, hearing device 100 may establish a BTC link with hearing device 204-2 in operation 720. External device 204-2 may provide audio content associated with the call to hearing device 100 by way of the BTC link in operation 722. In operation 724, hearing device 100 may provide audio associated with the call to user 702-1 in any suitable manner, such as described herein.

After the call between external device 204-3 and 204-2 is over, hearing device 100 may perform various operations to facilitate user 702-1 watching the video again by way of external device 204-1. For example, hearing device 100 may automatically disconnect the BTC link between hearing device 100 and external device 204-2. Hearing device 100 may then automatically re-establish a BTC link between hearing device 100 and external device 204-1. Hearing device 100 may then receive audio content associated with the video from external device 204-1 by way of the re-established BTC link between hearing device 100 and external device 204-1.

Figure 9:
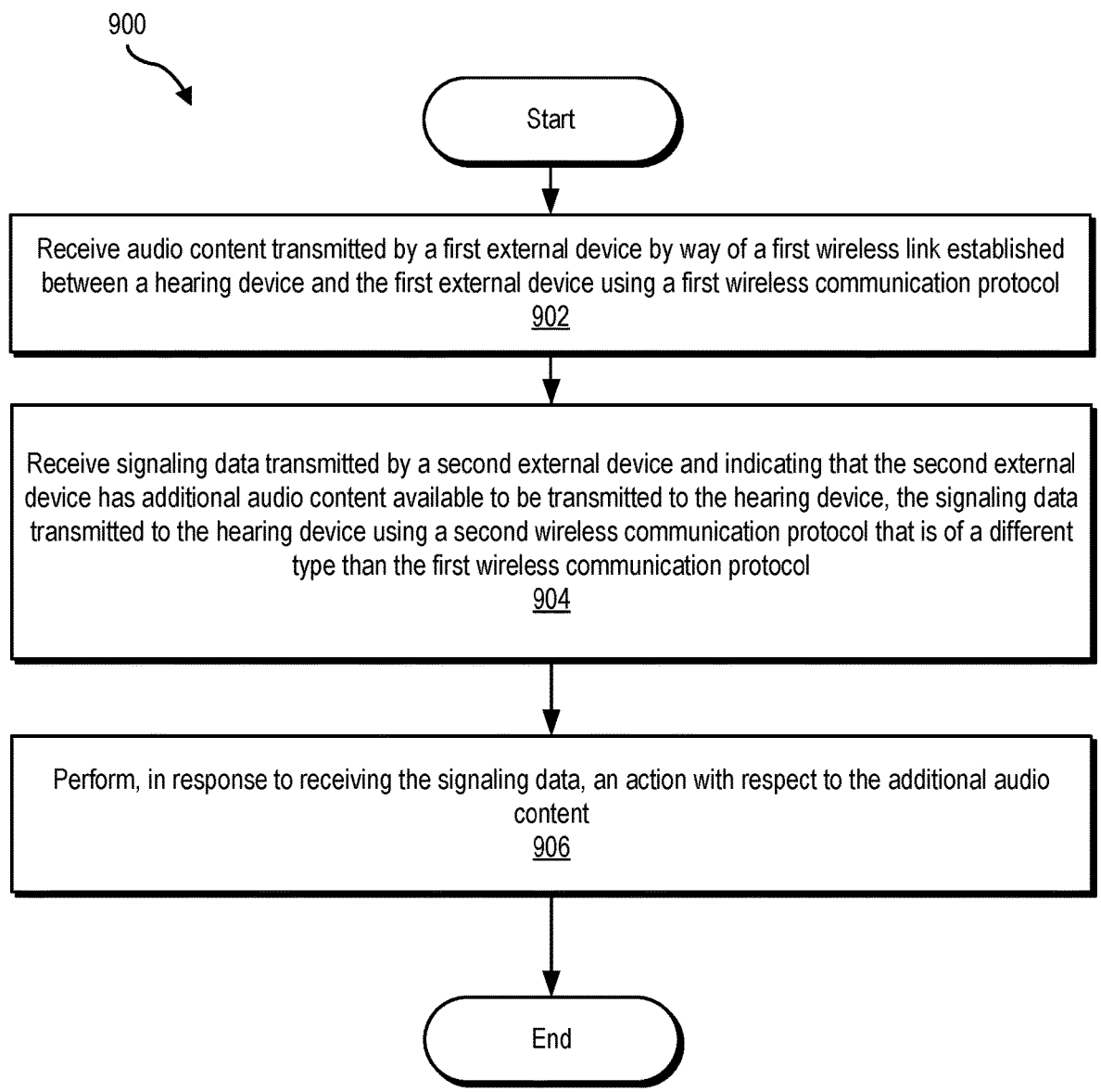
FIG. 9 illustrates an exemplary method for communicating with a hearing device according to principles described herein.

FIG. 9 illustrates an exemplary method for communicating with a hearing device. While FIG. 9 illustrates exemplary operations according to one embodiment, other embodiments may omit, add to, reorder, and/or modify any of the operations shown in FIG. 9. One or more of the operations shown in FIG. 9 may be performed by a hearing device such as hearing device 100, any components included therein, and/or any implementation thereof.

In operation 902, a hearing device (e.g., hearing device 100) may receive audio content transmitted by a first external device by way of a first wireless link established between the hearing device and the first external device using a first wireless communication protocol. Operation 902 may be performed in any of the ways described herein.

In operation 904, the hearing device may receive signaling data transmitted by a second external device, the signaling data indicating that the second external device has additional audio content available to be transmitted to the hearing device. As described herein, the signaling data transmitted to the hearing device is transmitted using a second wireless communication protocol that is of a different type than the first wireless communication protocol. Operation 904 may be performed in any of the ways described herein.

In operation 906, the hearing device may perform, in response to the signaling data, an action with respect to the additional content. Operation 906 may be performed in any of the ways described herein.

In some examples, a non-transitory computer-readable medium storing computer-readable instructions may be provided in accordance with the principles described herein.

The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 10:
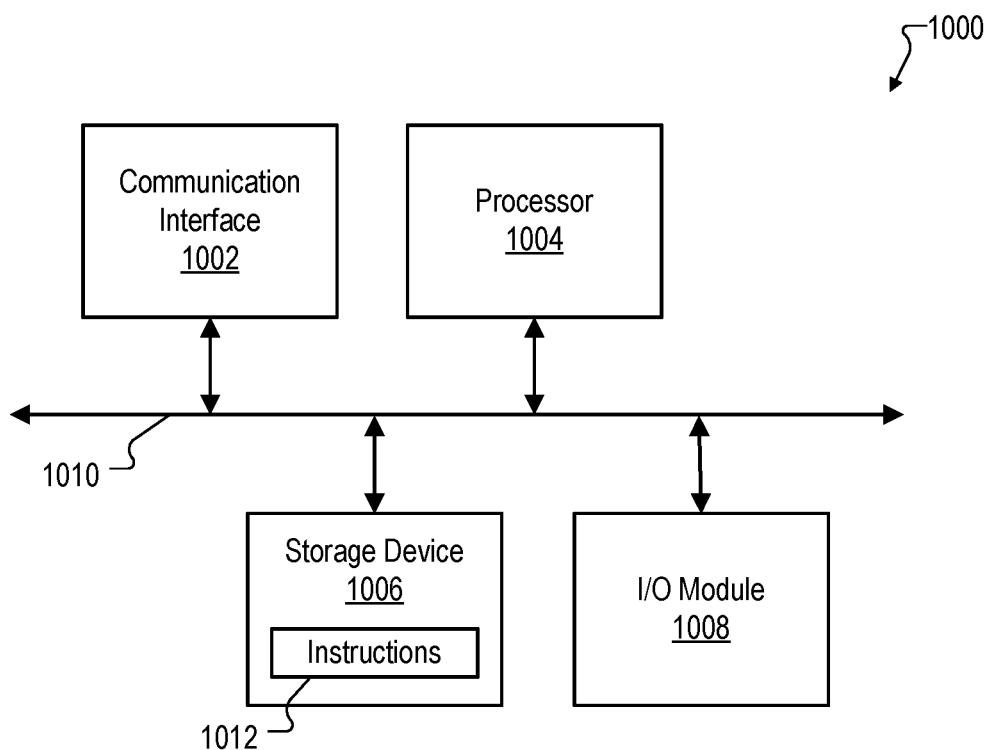
FIG. 10 illustrates an exemplary computing device according to principles described herein.

FIG. 10 illustrates an exemplary computing device 1000 that may be specifically configured to perform one or more of the processes described herein. As shown in FIG. 10, computing device 1000 may include a communication interface 1002, a processor 1004, a storage device 1006, and an input/output ("I/O") module 1008 communicatively connected one to another via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data and/or interpreting, executing, and/or directing execution of one or more of the instructions, processes, and/or operations described herein. Processor 1004 may perform operations by executing computer-executable instructions 1012 (e.g., an application, software, code, and/or other executable data instance) stored in storage device 1006.

Storage device 1006 may include one or more data storage media, devices, or configurations and may employ any type, form, and combination of data storage media and/or device. For example, storage device 1006 may include, but is not limited to, any combination of the non-volatile media and/or volatile media described herein. Electronic data, including data described herein, may be temporarily and/or permanently stored in storage device 1006. For example, data representative of computer-executable instructions 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems, hearing devices, and/or other components described herein may be implemented by computing device 1000. For example, memory 102 or memory 502 may be implemented by storage device 1006, and processor 104 or processor 504 may be implemented by processor 1004.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A hearing device configured to assist a user in hearing, the hearing device comprising:
a memory storing instructions; and
a processor communicatively coupled to the memory and configured to execute the instructions to:
receive, by way of a first wireless link established between the hearing device and a first external device using a first wireless communication protocol, audio content transmitted by the first external device;
receive signaling data transmitted by a second external device and indicating that the second external device has additional audio content available to be transmitted to the hearing device, the signaling data transmitted to the hearing device using a second wireless communication protocol that is of a different type than the first wireless communication protocol; and
perform, in response to receiving the signaling data, an action with respect to the additional audio content,
wherein the performing of the action with respect to the additional audio content includes:
determining that the first wireless link between the first external device and the hearing device has been disconnected;
instructing, after determining that the first wireless link between the first external device and the hearing device has been disconnected, the second external device to establish a second wireless link between the second external device and the hearing device using the first wireless communication protocol; and instructing the second external device to transmit the additional audio content to the hearing device by way of the second wireless link between the second external device and the hearing device.

2. The hearing device of claim 1, wherein the performing of the action with respect to the additional audio content further includes providing, based on the signaling data received from the second external device, a notification to the user of the hearing device that the additional audio content is available.

3. The hearing device of claim 2, wherein the notification includes an acoustic notification generated by the hearing device.

4. The hearing device of claim 2, wherein the providing of the notification includes transmitting the notification to an additional hearing device communicatively coupled to the hearing device and configured to assist the user in hearing.

5. The hearing device of claim 1, wherein the performing of the action with respect to the additional audio content further includes
receiving, from the second external device by way of the second wireless link, the additional audio content.

6. The hearing device of claim 5, wherein the first wireless link is disconnected in response to the user accepting to receive the additional audio content from the second external device.

7. The hearing device of claim 5, wherein the performing of the action with respect to the additional audio content further includes:
determining that the second external device has stopped transmitting the additional audio content to the hearing device by way of the second wireless link;
disconnecting, based on the determining that the second external device has stopped transmitting the additional audio content, the second wireless link between the hearing device and the second external device;
establishing a third wireless link between the hearing device and the first external device using the first wireless communication protocol; and
receiving the audio content again from the first external device by way of the third wireless link.

8. The hearing device of claim 1, wherein the performing of the action with respect to the additional audio content further includes instructing the first external device to pause the audio content.

9. The hearing device of claim 1, wherein the signaling data is broadcast from the second external device to the hearing device using the second wireless communication protocol.

10. The hearing device of claim 1, wherein the signaling data is transmitted by way of a second wireless link established between the hearing device and the second external device using the second wireless communication protocol.

11. The hearing device of claim 1, wherein:
the first wireless communication protocol is a Bluetooth Classic protocol and the first wireless link is a Bluetooth Classic link; and
the second wireless communication protocol is a Bluetooth Low Energy protocol.

12. The hearing device of claim 1, wherein the hearing device is incapable of connecting to more than one external device at a time by way of a wireless link established using the first wireless communication protocol.

13. The hearing device of claim 1, wherein:
the second external device is a computing device associated with the user; and
the additional audio content is associated with an incoming call to the computing device.

14. A hearing device management system comprising:
a memory storing instructions; and
a processor communicatively coupled to the memory and configured to execute the instructions to:
determine that a first wireless link is established between a first external device and a hearing device configured to assist a user in hearing, the first wireless link capable of carrying audio content transmitted from the first external device to the hearing device and established using a first wireless communication protocol;
determine that a second external device has additional audio content available to be transmitted to the hearing device;
instruct the second external device to transmit signaling data to the hearing device using a second wireless communication protocol that is of a different type than the first wireless communication protocol, the signaling data indicating that the second external device has additional audio content available to be transmitted to the hearing device;
determine that the first wireless link between the first external device and the hearing device has been disconnected;
instruct, after determining that the first wireless link between the first external device and the hearing device has been disconnected, the second external device to establish a second wireless link between the second external device and the hearing device using the first wireless communication protocol; and
instruct the second external device to transmit the additional audio content to the hearing device by way of the second wireless link between the second external device and the hearing device.

15. The hearing device management system of claim 14, wherein the processor is further configured to execute the instructions to:
determine that the user of the hearing device instructs the hearing device to receive the additional audio content; and
instruct the second external device to establish the second wireless link based on the determination that the user of the hearing device instructs the hearing device to receive the additional audio content.

16. A method comprising:
receiving, by a hearing device configured to assist a user in hearing, audio content transmitted by a first external device by way of a first wireless link established between the hearing device and the first external device using a first wireless communication protocol,
receiving signaling data transmitted by a second external device and indicating that the second external device has additional audio content available to be transmitted to the hearing device, the signaling data transmitted to the hearing device using a second wireless communication protocol that is of a different type than the first wireless communication protocol;
performing, by the hearing device in response to receiving the signaling data, an action with respect to the additional audio content,
wherein the performing of the action with respect to the additional audio content includes:
determining that the first wireless link between the first external device and the hearing device has been disconnected;

instructing, after determining that the first wireless link between the first external device and the hearing device has been disconnected, the second external device to establish a second wireless link between the second external device and the hearing device using the first wireless communication protocol; and instructing the second external device to transmit the additional audio content to the hearing device by way of the second wireless link between the second external device and the hearing device.

17. The method of claim 16, wherein the performing of the action with respect to the additional audio content further includes receiving, from the second external device by way of the second wireless link, the additional audio content.

18. The method of claim 17, wherein:

the additional audio content is associated with an incoming call to the second external device; and the first wireless link is disconnected after the second external device establishes the incoming call.

\* \* \* \* \*